No. 808,259. PATENTED DEC. 26, 1905.
E. SCHATTNER.
MEASURING INSTRUMENT.
APPLICATION FILED FEB. 3, 1905.

Witnesses.

Inventor
Ernest Schattner.
by Albert G. Davis
Att'y.

UNITED STATES PATENT OFFICE.

ERNEST SCHATTNER, OF SCHENECTADY, NEW YORK, ASSIGNOR TO GENERAL ELECTRIC COMPANY, A CORPORATION OF NEW YORK.

MEASURING INSTRUMENT.

No. 808,259.        Specification of Letters Patent.        Patented Dec. 26, 1905.

Application filed February 3, 1905. Serial No. 243,969.

*To all whom it may concern:*

Be it known that I, ERNEST SCHATTNER, a subject of the King of Great Britain, residing at Schenectady, in the county of Schenectady and State of New York, have invented certain new and useful Improvements in Measuring Instruments, of which the following is a specification.

This invention relates to measuring instruments, and more particularly to instruments for indicating the maximum of a variable quantity.

The object of my invention is to provide a simple and inexpensive maximum-indicator which will be accurate in its readings, reliable in its operation, and which will not respond to momentary fluctuations of the actuating force.

A further object of my invention is to provide a device for indicating the maximum electric demand which can be used conveniently in connection with the standard types of integrating wattmeters now generally used to measure the consumption of electric energy during a certain period.

To this end my invention comprises a device which can be readily attached to a rotary shaft and which is provided with one or more indicating elements adapted to be moved from one position to another by centrifugal force.

The novel features of my invention can be employed in devices differing considerably in construction and mode of operation; but that which I prefer to use consists of a tube containing a number of rolling elements—as, for instance, small metal balls—which are actuated by centrifugal force to roll up an incline and over a bend in the tube, from which position they cannot return. The tube is preferably filled with a viscous compound which will so retard the movement of the indicating elements as to prevent the instrument from indicating demands on the system which extend over only a short period.

My invention will be better understood by reference to the following description, taken in connection with the accompanying drawings, in which—

Figure 1:
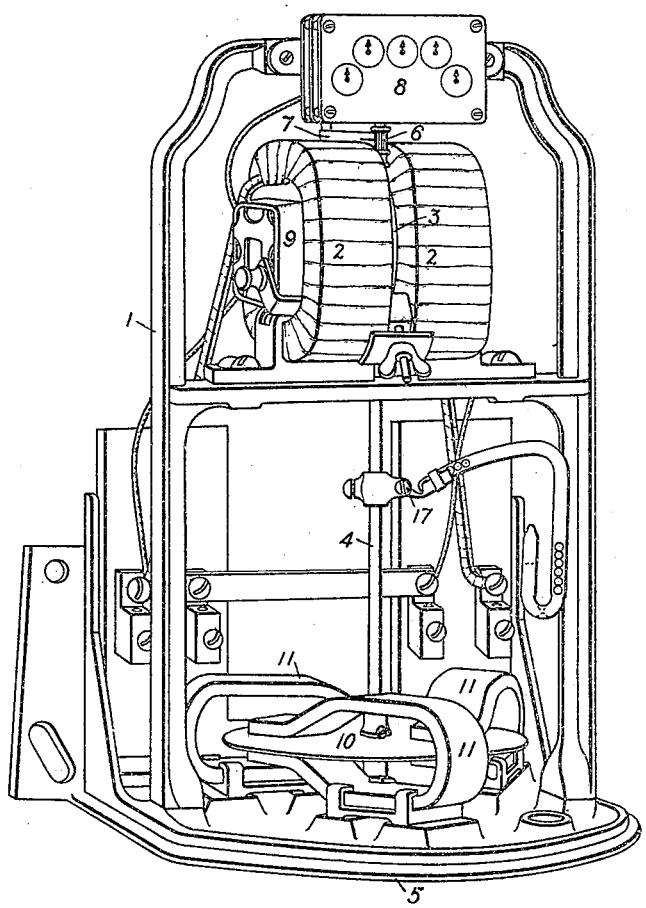
Figure 2:
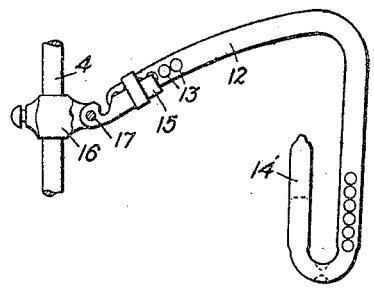

Figure 1 is a perspective view of an integrating wattmeter equipped with my improved maximum-indicator having the casing removed, and Fig. 2 is a view of the maximum-demand attachment.

The novel features of my invention will be definitely indicated in the claims appended hereto.

Referring to the drawings, Fig. 1 shows an integrating wattmeter such as is now in general use in measuring the consumption of electric energy, that shown in the drawings being the well-known Thomson recording-wattmeter. It consists of a frame 1, on which are mounted field-coils 2 2, connected in series in one side of the circuit and arranged in inductive relation to an armature 3, carried by a shaft 4. This shaft is mounted for rotation in suitable bearings carried by the base 5 of the meter and the frame 1 and carries a commutator 6, to which the coils of the armature 3 are connected and on which brushes 7 are held by spring tension. Shaft 4 is geared to a dial 8, from which the energy consumed is read. To compensate for friction in the bearings and the dial-train of the meter, an auxiliary field-coil 9 is mounted in inductive relation to the armature 3 and adjustable with relation thereto within one of the coils 2. Coil 9 is connected in series with armature 3 and a suitable resistance across the lines. The rotation of shaft 4 is retarded by a damping-disk 10, which rotates in the fields of permanent magnets 11 11, mounted on the base 5. A more detailed description of these parts of the meter is not considered necessary, as they form no part of my invention and as the meter is of a standard type now in general use and well known to those skilled in the art.

The maximum-demand attachment consists of a tube 12, preferably of glass, bent as shown in the drawings. Within the tube are a number of small metal balls 13, slightly smaller in diameter than the tube, so that they can roll freely from one position to another. The tube is filled with a viscous compound—such, for instance, as oil or glycerin—which serves to retard the movement of the balls 13. I prefer to bend the end 14 of the tube up vertically, as shown, and to allow a small amount of air to remain in this portion of the tube to provide for the expansion and contraction of the liquid with changes of temperature. Tube 12 is secured in any suitable way to a holder 15, which is pivotally secured to a hub 16. A set-screw in hub 16 serves to secure the attachment to the shaft 4, and the pivotal connection between the holder and the hub 16 is preferably in the form of a screw 17, which when the desired adjustment of the tube with respect to the shaft is obtained may be tightened to hold the parts permanently in this relation.

The maximum-demand attachment is secured on the meter-shaft in the space between the field-coils and the damping device. The current consumed, or a definite portion thereof, passes through the field-coils 2 2 and, acting inductively on the armature 3, causes the shaft 4 to revolve, and the speed of rotation of the shaft will be proportional directly to the current consumed. The centrifugal force acting on the indicating elements of the maximum-demand attachment being proportional to the speed of rotation of shaft 4 will also vary as the current consumed. Therefore as the moving element of the meter rotates the balls 13 will roll up the inclined leg of the tube 12, the number of balls moving and the extent of the movement being dependent upon the amount of current that is being consumed. On account of the damping effect of the viscous liquid the balls will move very slowly, and a momentary acceleration of the rotation of the moving element will not appreciably affect the positions of the balls. The curvature and inclination of the leg of the tube 12 may be such that the balls will move out to the end of the inclined leg of the tube and drop into the vertical leg at predetermined speeds—as, for instance, one ball for each unit of current passing at the time. At the end of a month or other period of time the number of balls in the vertical leg represents the maximum demand of electric energy at any one time, and all the balls may then be returned to the inclined leg to record the demand during the next period.

As before stated, I wish it understood that the principles of my invention may be embodied in constructions quite different from that illustrated and described herein. Such modifications I consider within the scope of my invention, and I aim to cover them in the claims appended hereto.

What I claim as new, and desire to secure by Letters Patent of the United States, is—

1. The combination of a rotatable shaft and means associated therewith and actuated by centrifugal force for indicating the maximum speed of rotation of said shaft.

2. An electric measuring instrument having a shaft pivoted for rotation, a coil, means for rotating the shaft at a rate varying with the current in the coil, and means associated with the shaft and actuated by centrifugal force for indicating the maximum electric demand in a period of time.

3. The combination of an electric meter of the motor type, and means associated with the shaft thereof and actuated by centrifugal force for indicating the maximum electric demand in a period of time.

4. The combination of an electric meter of the motor type, a maximum-demand device rotating with the shaft thereof, indicating elements carried by said device and actuated by centrifugal force to move to a new position, and means to prevent the return of said elements to their initial position.

5. The combination of an electric meter of the motor type, a maximum-demand device attached to the shaft thereof, indicating elements carried thereby and actuated by centrifugal force to move to a new position, means to retard movement of said elements, and means to prevent the return of said elements to their initial position.

6. A maximum-indicating device comprising a bent tube, indicating elements therein, and means at one end of the tube for attaching it to a rotary shaft.

7. A maximum-indicating device comprising a bent tube, a plurality of balls within the tube adapted to move over the bend in the tube, means for retarding movement of the balls, and means at one end of the tube for attaching it to a rotary shaft.

8. A maximum-indicating device comprising a bent tube, indicating elements therein, means at one end of the tube for attaching it to a rotary shaft, and a hinge permitting adjustment of the tube relatively to the shaft.

In witness whereof I have hereunto set my hand this 2d day of February, 1905.

ERNEST SCHATTNER.

Witnesses:
BENJAMIN B. HULL,
HELEN ORFORD.